C. MARCUCCILLI.
BAKING IRON.
APPLICATION FILED NOV. 1, 1909.

965,475.

Patented July 26, 1910.

2 SHEETS—SHEET 1.

Witnesses:
A. A. Olson
B. G. Richards

Inventor:
Camillo Marcuccilli
by Joshua R. H. Potts
his Attorney

C. MARCUCCILLI.
BAKING IRON.
APPLICATION FILED NOV. 1, 1909.

965,475.

Patented July 26, 1910.

2 SHEETS—SHEET 2.

Witnesses:
Q. A. Olson
B. G. Richards

Inventor:
Camillo Marcuccilli
by Joshua R. H. Potts
his Attorney.

UNITED STATES PATENT OFFICE.

CAMILLO MARCUCCILLI, OF CHICAGO, ILLINOIS.

BAKING-IRON.

965,475.   Specification of Letters Patent.   Patented July 26, 1910.

Application filed November 1, 1909. Serial No. 525,809.

*To all whom it may concern:*

Be it known that I, CAMILLO MARCUCCILLI, a subject of the King of Italy, residing at Chicago, county of Cook, and State of Illinois, have invented certain new and useful Improvements in Baking-Irons, of which the following is a specification.

My invention relates to cooking utensils and more specifically to that class thereof known as baking irons.

The object of my invention is the provision of an improved cooking utensil of the character mentioned especially designed for the forming and baking of batter into pyramidal receptacles especially adapted for the holding of ice cream.

A further object is the provision of a baking iron as mentioned which may be readily manipulated, which in operation will be of the highest possible efficiency, and which will be of strong, durable and economical construction.

Other objects will appear hereinafter.

With these objects in view my invention consists in a baking device characterized as above mentioned and in certain details of construction and arrangement of parts all as will be hereinafter fully described and particularly pointed out in the appended claim.

Figure 1:
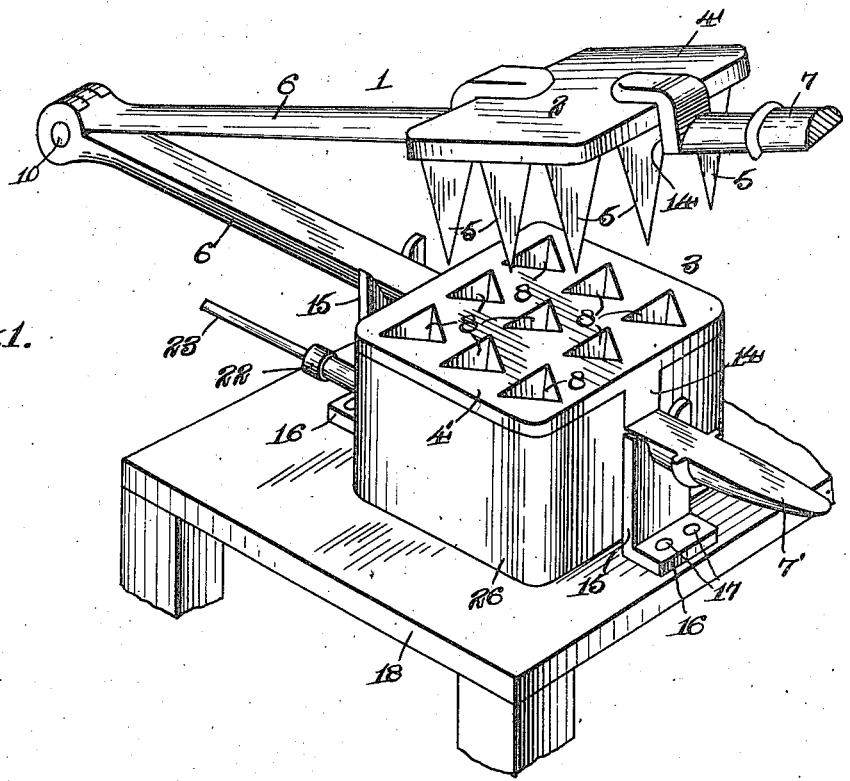
Figure 2:
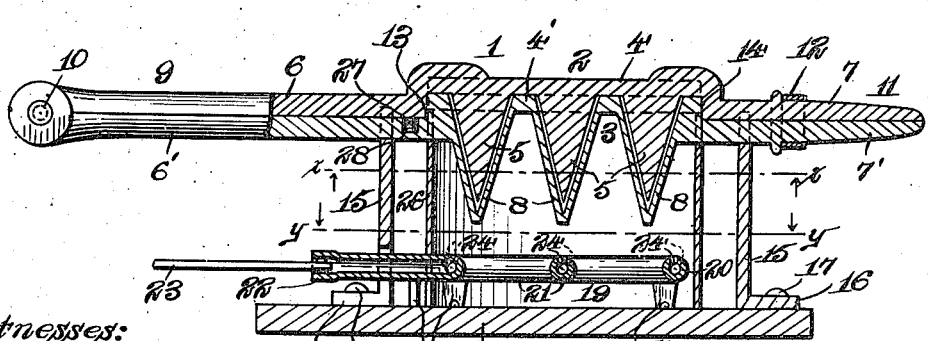
Figure 3:
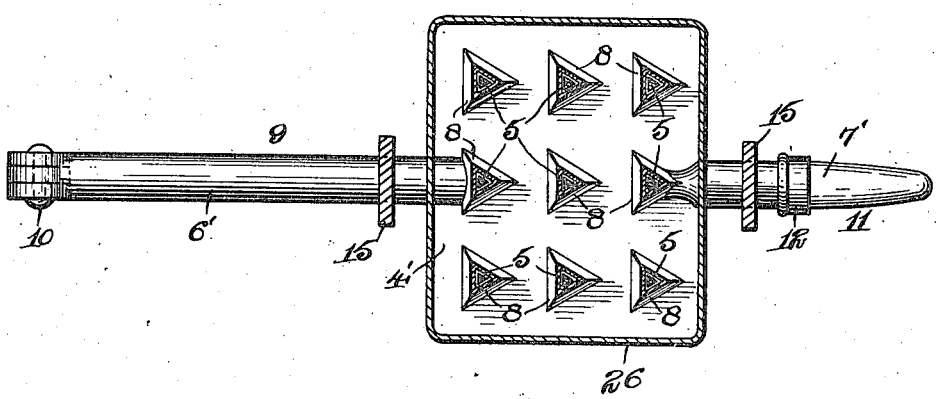
Figure 4:
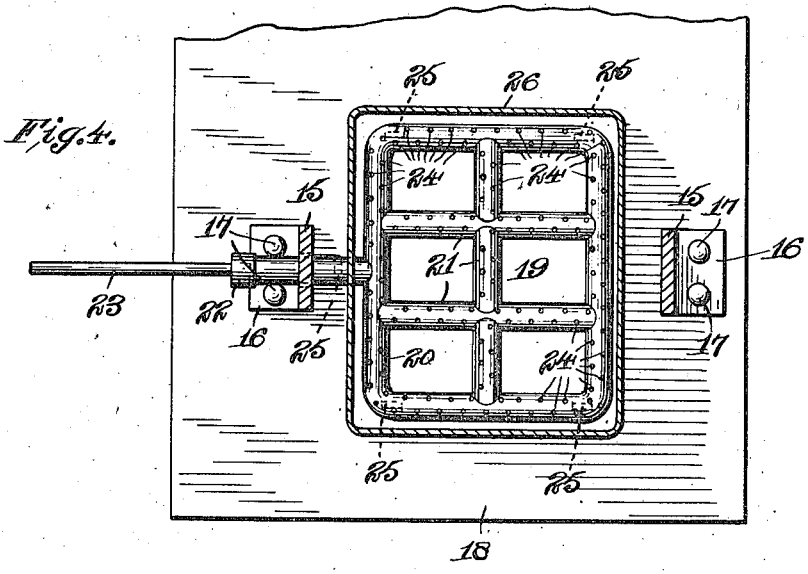

My invention will be more readily understood by reference to the accompanying drawings forming a part of this specification, and in which, Figure 1 is a perspective view of my device in its preferred form showing the hinged parts of the baking iron in open position, Fig. 2 is a substantially central longitudinal section thereof, and Figs. 3 and 4 are horizontal sections taken respectively on lines x—x and y—y of Fig. 2.

Referring now to the drawings, 1 indicates the baking iron proper, consisting of the male part 2 and the lower female part 3 hingedly secured together. Comprised in the part 2 is a preferably substantially rectangular plate or body portion 4 provided upon the under side of which is a plurality of spaced depending pyramidal projections 5 formed preferably integral therewith. Formed integrally with and rearwardly projecting, preferably centrally, from the rearward edge of the plate 4 is a semi-cylindrical shank extension 6. Formed integrally with and forwardly projecting centrally from the forward edge of said plate portion is a substantially semi-cylindrical extension 7, the outer end of the latter, as shown, being slightly tapered. Comprised in the part 3 is a body or plate portion 4' of dimensions substantially the same as those of the portion 4 of the part 2. Formed in and depending from the plate 4' is a plurality of pyramidal cups 8 counterparts of the projections 5, so spaced therein as to be adapted to centrally receive the latter, said projections being of dimensions slightly less than the inside dimensions of said cups, whereby, when the former are positioned in the latter, that is, when the plate 4 is arranged symmetrically upon the plate 4', as shown in Fig. 2, a pyramidal space will be formed between the adjacent surfaces of each pair of said parts 5 and 8.

Formed upon and rearwardly projecting from the rearward edge of the plate 4' is a semi-cylindrical shank extension 6' coextensive in length with the extension 6, said extensions 6 and 6' being so disposed relative to the plates 4 and 4', that, when the latter are in superimposed position, said extensions will be likewise positioned to form a complete cylindrical shank 9 adapted to serve in the capacity of a grip or handle and also as a supporting trunnion for the iron. The rearward extremities of said extensions are interlocked as shown and secured together by a hinge pin 10 whereby the movement of the shank parts 6 and hence of the plate 4 is limited only to a vertical plane including the longitudinal axis of said shank.

Formed integrally with and forwardly projecting from the forward edge of the plate 4' is a substantially semi-cylindrical extension 7' of a form similar to and positioned for registration with, the extension 7 to form, when the plates 4 and 4' are closed together, a complete substantially cylindrical shank 11 adapted to serve in the capacity similar to that of the shank 9 before described. By forming the shank 11 forwardly tapering, as shown and stated, a ring 12 may be readily slipped over the extremity thereof to rigidly hold said parts 7 and 7' thereof and hence the plates 4 and 4' in closest proximity with each other. The coacting shank parts 6—6' and 7—7' adjacent their inner extremities are preferably offset as at 13 and 14 respectively, clearly shown in Fig. 2, such provision evidently facilitating the proper positioning of the plate 4 upon the plate 4' upon the lowering thereof into contact therewith.

15 indicate supporting bearing brackets the angular base portions 16 of which are suitably rigidly secured, preferably by bolts 17 to a table top or other supporting structure 18 employed. Said brackets are so spaced as to adapt the semi-circularly recessed upper extremities thereof to loosely receive the shanks 9 and 11 adjacent their inner ends, the same being of a height such that the lower extremities of the cups 8 of the iron, when the latter is supported therein, will be elevated a considerable extent above the base 18. Positioned directly below the cups 8 is a suitable gas burner 19. The preferred type and design of burner employed is that shown in the drawings which consists of an outer or peripheral tubular portion 20 rectangular in design, and transversely extending tubular portions 21, the passages through said portions communicating with an inlet nipple 22 which is connected to a fuel supply pipe 23. Formed in the upper side of each of the portions 20 and 21 is a double row of gas exhaust ports 24 and depending from the under side thereof supporting legs 25. Resting upon the base 18, the same inclosing the burner 19 and the lower ends of the cup portions 8 of the member 3 and extending approximately into contact with the under surface of the latter is a tubular housing or heat concentrator 26. Said housing, in order to accommodate the shanks 9 and 11 and the projecting nipple 22 is slotted accordingly.

The operation of the device is as follows: Upon the burner being lighted and the male member 2 of the iron being elevated, as shown in Fig. 1, a quantity of previously prepared batter is supplied to each of the cups 8. The member 2 is then immediately lowered until the plate 4 thereof rests upon the plate 4', the same being locked in such position by the ring 12 which is slipped over the end of the shank 11. Upon so doing, the batter contained in the cups 8 will be forced upwardly by the projections 5, to fill the pyramidal space formed between the adjacent surfaces of said cups and projections. After remaining in this position for a few minutes, or a period of time sufficient to permit of the proper baking of the lower end portions of the pyramids in the course of preparation, the iron will be inverted in its supporting brackets so as to effect the baking of the offset end portions thereof. Such inversion of the iron may only be effected by grasping the shanks 9 and 11 of the iron and lifting or elevating the latter from its supporting brackets. After being permitted to remain in this position a period of time requisite to effect the proper baking of said ends of said pyramids, the iron is again reverted, the ring 12 removed from the shank 11, and the male member 2 elevated to its initial position, whereupon the baked pyramids wholesome and delicious may by means of the fingers be readily removed from the device. In order to facilitate the releasing of the iron part 2 from engagement with the part 3, it being evident that there will be a tendency for said parts to stick together because of the incidental adherency existing between such parts, a compression spring 27 is interposed between the shank parts 6 and 6', the same being arranged in a recess 28 formed in the upper side of the latter. Said spring is so arranged as to be depressed by the shank 6 when lowered, hence the same will exert a constant upwardly directed force upon said shank when in such position, and thereby adapting the same to serve in the capacity above stated.

The device, as described, is designed to effect the formation of ice cream receptacles of a pyramidal form rather than conical for several reasons. First, because of their pyramidal form, the same, when lying flat or upon their sides, will not be apt to roll from the table or other support as is the case with conical receptacles of this kind, and thus be broken. And further, because of such form the same may be more readily compactly nested together when packing for shipment.

While I have shown what I deem to be the preferable form of my device I do not wish to be limited thereto as there might be various changes made in the details of construction and the arrangement of parts without departing from the spirit of the invention comprehended within the scope of the appended claims.

Having described my invention what I claim as new and desire to secure by Letters Patent is:

The combination in a baking device, of a baking iron, said iron comprising an upper flat plate portion and a lower flat plate portion, elongated substantially semi-cylindrical shanks horizontally projecting from the rear edges of said plates, said shanks being hinged together at their outer ends and one of said shanks being provided with a recess; a spring in said recess bearing upon the other shank; integral slotted pyramidal projections spaced upon and depending from the under side of said upper plate; correspondingly formed cups provided in the lower plate and adapted, when said plates are in superimposed position, to receive said projections so as to form pyramidal spaces between the outer surfaces of the latter and the inner surfaces of said cups; corresponding substantially semi-cylindrical shanks projecting from the forward edges of said plates, said shanks being tapered toward their outer ends; a ring adapted to encircle said shanks to lock said plates in superimposed position, said before named shanks and said last named shanks being offset at points adjacent their inner extremities and supporting brackets engaging said shanks for removably supporting said iron; a gas burner arranged below said plate portions of said irons, the said burner being rectangular in form and provided with cross members perforated to form smaller burner spaces; and a tubular housing or heat retainer encircling said burner and the lower portion of said plate portions, substantially as described.

In testimony whereof I have signed my name to this specification in the presence of two subscribing witnesses.

CAMILLO $\underset{\text{mark}}{\overset{\text{his}}{\times}}$ MARCUCCILLI.

Witnesses:
JOSHUA R. H. POTTS,
JANET E. HOGAN.